United States Patent [19]
Garcia et al.

[11] Patent Number: 6,134,623
[45] Date of Patent: Oct. 17, 2000

[54] METHOD AND SYSTEM FOR TAKING ADVANTAGE OF A PRE-STAGE OF DATA BETWEEN A HOST PROCESSOR AND A MEMORY SYSTEM

[75] Inventors: Raymond Eugene Garcia, San Jose; John Richard Paveza, Morgan Hill, both of Calif.

[73] Assignee: International Business Machines Corporation, Armonk, N.Y.

[21] Appl. No.: 09/137,670

[22] Filed: Aug. 21, 1998

[51] Int. Cl.[7] .................................................. G06F 13/00
[52] U.S. Cl. ............................ 710/129; 710/5; 710/22; 710/126; 710/127; 345/521; 345/501
[58] Field of Search .................................. 710/126, 127, 710/129, 22, 5, 52; 345/521, 501

[56] References Cited

U.S. PATENT DOCUMENTS

| | | |
|---|---|---|
| 5,448,704 | 9/1995 | Spaniol et al. . |
| 5,522,050 | 5/1996 | Amini et al. . |
| 5,634,033 | 5/1997 | Stewart et al. . |
| 5,664,117 | 9/1997 | Shah et al. . |
| 5,724,613 | 3/1998 | Wszolek . |
| 5,734,924 | 3/1998 | Cheng et al. . |

OTHER PUBLICATIONS

IBM Technical Disclosure Bulletin, vol. 41, No. 01, Jan. 1998, pp. 749–751, "Generic Communication in a Multi-Component Computer System Model".

*Primary Examiner*—Ayaz R. Sheikh
*Assistant Examiner*—Rupal D. Dharia
*Attorney, Agent, or Firm*—Ohlandt, Greeley, Ruggiero & Perle, L.L.P.

[57] ABSTRACT

A system for coupling a host processor to a memory subsystem and enabling efficient transfer of data therebetween, where the memory subsystem responds to a data block read request by dispatching the designated data block and N data segments that are used by the receiver to determine the integrity of the data transfer. The system comprises a first bus system which couples the memory subsystem, via a bridge, to a controller that is, in turn, coupled by a second bus system to the host processor. The controller responds to a read request from the host processor for a first data block by dispatching to the bridge modified read requests that include (i) an address of the first data block and (ii) an address for the N data integrity segments. The bridge transfers the modified read requests to the memory subsystem, receives the first data block from the memory subsystem and transfers it to the controller. The bridge then receives the N data integrity segments, uses them to check the integrity of the data transfer, and discards them. Because of the aforesaid handling of the N data integrity segments, the bridge, upon receiving a next read request of data in addresses that are sequential to the first data block, determines there has been no discontinuity of sequential data block addresses.

11 Claims, 2 Drawing Sheets

METHOD AND SYSTEM FOR TAKING ADVANTAGE OF A PRE-STAGE OF DATA BETWEEN A HOST PROCESSOR AND A MEMORY SYSTEM

FIELD OF THE INVENTION

This invention relates to a system for coupling a host processor and a memory subsystem to enable efficient transfers of data therebetween and, more particularly, to a method and apparatus for enabling a prestaging of data from the memory subsystem, when the pre-staged data includes checking or other control data that has not yet been requested by the host processor.

BACKGROUND OF THE INVENTION

Computer systems typically include more than one bus, each bus having devices attached which communicate locally with each other. Often, system busses and peripheral busses use different sets of standard protocols or rules to conduct data transfers between the different devices and components that are connected thereover. Devices for translating data that is transferred from one bus architecture to another bus architecture are often called bridges. To permit system-wide communications on different bus systems, bus-to-bus bridges match the communications protocol of one bus with that of another bus.

Presently, "local busses" operate in such a manner as to be more closely associated with central processor operations and are capable of running at speeds that approximate the speed at which the central processor, itself, runs. One popular type of "local bus" is the "peripheral component interconnect" (PCI) bus. A system using a PCI bus includes, in addition to the physical PCI bus, a first bridge circuit which provides an interface and controls transfers of data among the devices connected to the PCI bus. A second bridge circuit (also called a bus controller) provides an interface for transfer of data between a further bus system and the PCI bus. The arrangement is such that components on the PCI bus transfer and receive data via the first bridge, while components on the second bus system transfer and receive data via the second bridge (or bus controller). The two bridges communicate with each other and enable data transfers between elements connected to the PCI bus and the second bus system.

Currently, a widely used bus system protocol for connecting host processors to peripheral devices, such as memory subsystems, is one which adheres to the small computer system interconnect (SCSI) protocol. The prior art includes a number of teachings regarding methods for interconnecting SCSI bus systems to PCI bus systems. Examples of such teachings can be found in U.S. Pat. No. 5,634,033 to Stewart et al. and U.S. Pat. No. 5,522,050 to Amini et al.

U.S. Pat. No. 5,664,117 to Shah et al. discloses a bridge which is arranged to enable highly efficient memory transfers from a first bus to a second bus. One such bus is a PCI bus and the second bus, for example, is one which adheres to either the industry standard architecture (ISA) or the expanded industry standard architecture (EISA). The Shah et al. system describes a procedure for employing the bridge to stage data that is being transferred from a memory system to a host processor (or vice-versa) during a DMA (direct memory access) transfer.

A DMA transfer relieves a central processor of the need to accomplish many of the individual data transfers that are required during operation of a computer system. A DMA device is typically given a memory address and an amount of data to be transferred, by the central processor, and then proceeds to transfer that amount of data, beginning at the specified address. The DMA device generates a series of sequential addresses and accesses the data stored at each of those addresses.

The Shah et al. system describes a bridge with a plurality of line buffers for storing data being read from a first bus to a second bus. The bridge reads an amount of data sufficient to fill the storage space in a first line buffer, beginning at an address being read, and completely fills a next line buffer with data at following sequential addresses, assuming that read operations, after the first line buffer, will occur at sequential addresses. In such manner, Shah et al. accomplish a prestaging of data.

In many bridges, such as the type described by Shah et al., means are provided to assure the integrity of data received during a DMA transfer. Thus, if data transfers are being accomplished in block sizes, presuming that a host processor has requested a plurality of blocks occurring at sequential addresses, the bridge is designed to signal an error if an out-of-sequence address is encountered. In such case, all data prestaged for a block is dumped and data transfer of the block is repeated.

It has been discovered that such an out-of-sequence data transfer can occur when a memory controller, during a DMA, appends check or other control bytes to the data block being transferred. Under such circumstances, the bridge which receives the data block with the appended control or check bytes assumes that the control and check bytes come from sequential addresses to those occupied by the data block.

When a next data block is received which commences at the immediately succeeding address after the first data block (not taking into account the N bytes of metadata), an error state is assumed as the bridge is expecting data starting at the last address plus N of the first block. However, it receives data starting a the last address plus 1 of the first block. As a result, the DMA transfer is suspended and a prestage of the most recent block is repeated.

Accordingly, it is an object of this invention to provide an improved method for handling of data transfers over a bridge circuit, wherein check or other control bytes are appended to data blocks being transferred.

SUMMARY OF THE INVENTION

A system embodying the invention couples a host processor to a memory subsystem and enables efficient transfer of data therebetween. The memory subsystem responds to a data block read request by dispatching the designated data block and N data segments which are used by the receiver to determine the integrity of the data transfer. The system further includes a first bus system which couples the memory subsystem, via a bridge, to a controller that is, in turn, coupled by a second bus system to the host processor. The controller responds to a read request from the host processor for a first data block by dispatching to the bridge modified read requests that include (i) an address of the first data block and (ii) an address for the N data integrity segments. The bridge transfers the modified read requests to the memory subsystem, receives the first data block from the memory subsystem and transfers it to the controller. The bridge then receives the N data integrity segments and discards them after using them to aid in deriving a check value that will later be used to check the integrity of the data transfer. The bridge then determines the address of a last byte of the data block transferred to the controller.

Concurrently, the bridge anticipates a request for a next data block at addresses that are in sequence from the first data block and downloads that next data block. The bridge, upon receiving a next read request of data in addresses that are sequential to the first data block, is thereby able to determine that there has been no discontinuity of sequential data block addresses as a result of the aforesaid handling of the N data integrity segments.

DETAILED DESCRIPTION OF THE INVENTION

Figure 1:
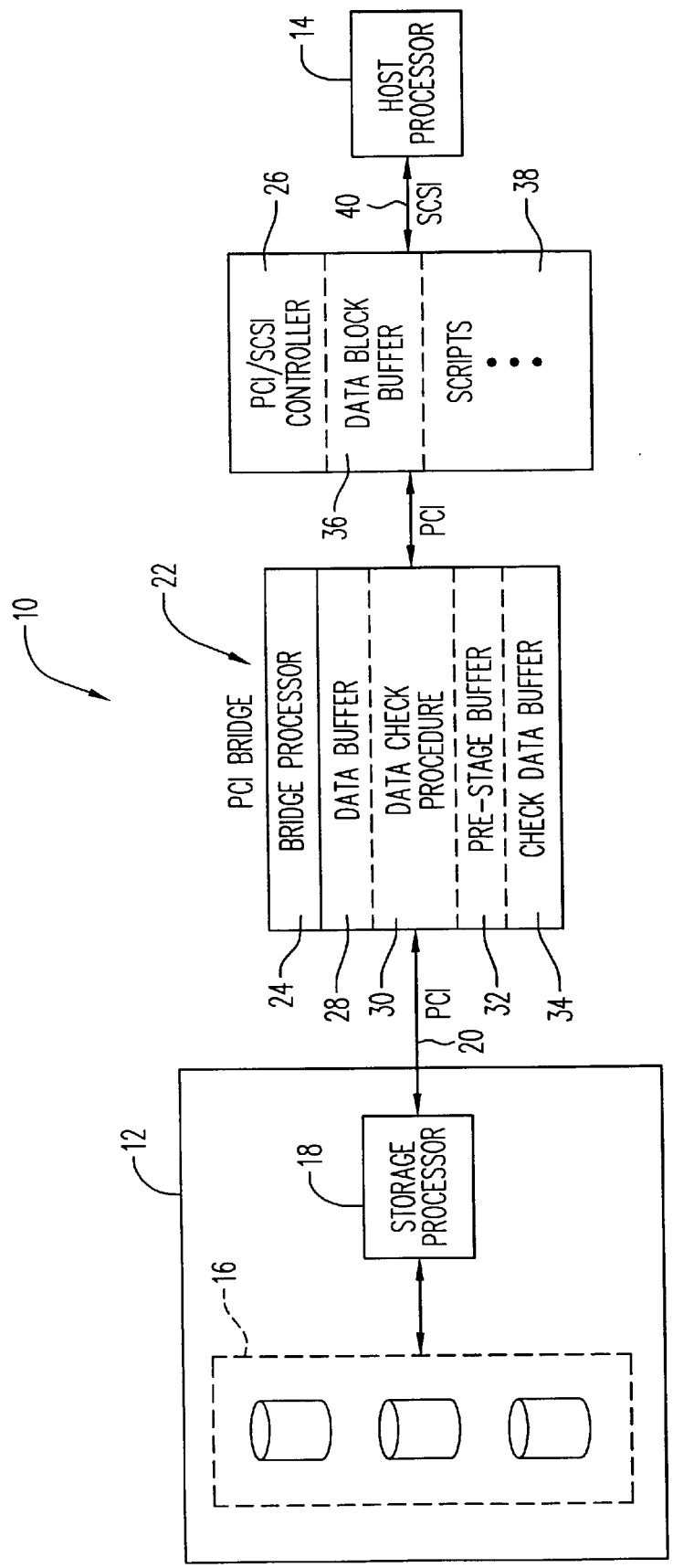
FIG. 1 is a high-level block diagram illustrating a system for performing the invention.

A computing system 10 is shown in FIG. 1 and includes is a data storage subsystem 12 that provides a mass storage facility for a host processor 14. Data storage subsystem 12 includes a plurality of disk drives 16 and a storage processor 18. Data storage subsystem 12 is coupled by PCI bus 20 to a PCI bridge 22. A bridge processor 24 controls the operations of PCI bridge 22 and enables transfers of data between data storage subsystem 12 and a PCI/SCSI controller 26.

PCI bridge 22 includes a data buffer 28 which serves to temporarily store requested data passing between host processor 14 and data storage subsystem 12. A data check procedure 30 is stored within PCI bridge 22 to enable the integrity of data transferred between data storage subsystem 12 and PCI bridge 22 to be confirmed. More specifically, each time data storage subsystem 12 transfers a block of data to PCI bridge 22, N bytes of check data are appended which serve, for example, as cyclic redundancy check (CRC) characters. The CRC characters are used by data check procedure 30 to assure that a data block is received without error.

PCI bridge 22 further includes a prestage buffer 32 which is utilized to contain a next block of data, immediately following a previously accessed block of data, in advance of a request being received therefor. More specifically, bridge processor 24 upon receiving a request for a designated data block, passes the read request to data storage subsystem 12, and thereafter accesses a data block residing in immediately following addresses, based upon the assumption that a next incoming read request from host processor 14 will request that data block. That "pre-staged" data block is then stored in pre-stage buffer 32, to await receipt of a request therefor.

If PCI bridge 22 was to maintain track of the addresses of received data, based upon a total count of data bytes received from data storage subsystem 12, the presence of the N check bytes from data storage subsystem 12 would continuously provide erroneous address data to bridge processor 24. More particularly, if it is assumed that each data block comprises 512 bytes and that the check data comprises an additional 12 bytes, then bridge processor 24 would calculate that the last received address of a data block is the sum of the address of the last byte of a previous data block plus 12 bytes (i.e., 524 bytes from the beginning address of the data block). However, host processor 14 is unaware of (and not interested in) the additional 12 check bytes transferred between data storage subsystem 12 and PCI bridge 22. Accordingly, when host processor 14 requests a next serially positioned data block, it requests a series of addresses beginning at byte 513, rather than byte 524. Upon seeing this discrepancy, bridge processor 24 assumes that its pre-staged data block in data buffer 30 is invalid and dumps that data.

Applicant's invention avoids that problem through use of a check data buffer 34 in PCI bridge 22. The function of check data buffer 34 will be described in further detail below.

PCI/SCSI controller 26 includes a data block buffer 36 which serves to temporarily buffer data blocks fed to it from PCI bridge 22. A Scripts memory 38 is contained within PCI/SCSI controller 26 and stores a plurality of Scripts (e.g., subroutine procedures) that are utilized to carry out a variety of functions within data processing system 10. Each Script may be called by PCI/SCSI controller 26 in response to an instruction or message from another device within data processing system.

Figure 2A:
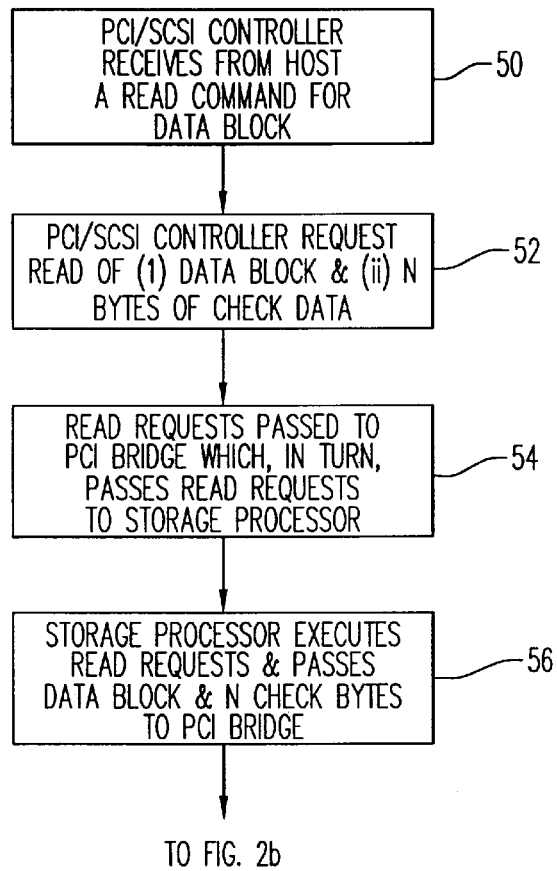
FIGS. 2a and 2b are a high-level logic diagrams illustrating the method of the invention.
Figure 2B:
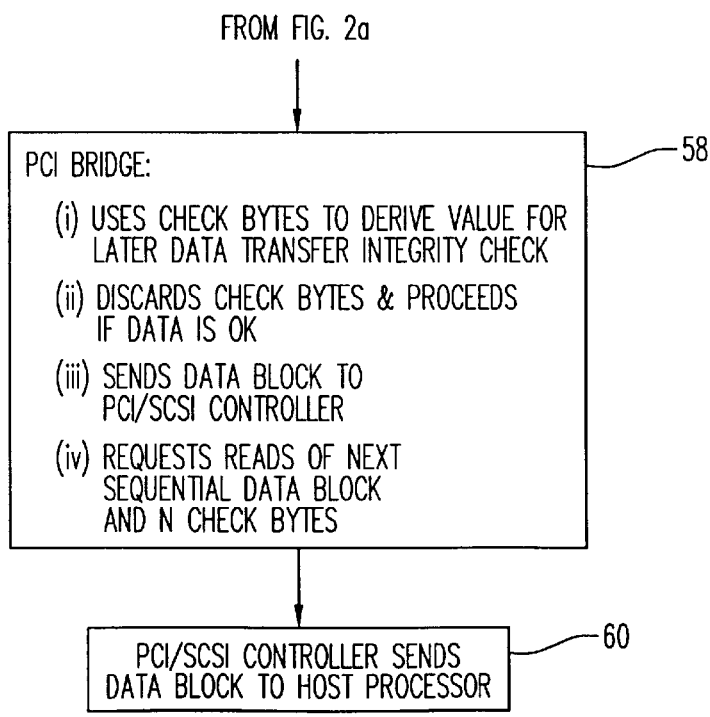

It will be assumed that host processor 14 issues a read request via SCSI bus 40 to PCI/SCSI controller 26. In addition to providing interface actions that enable conversion of the SCSI format data to that which can be transferred over a PCI bus, PCI/SCSI controller 26, responds to the read request from host processor 14 by invoking a read Script 38. Read Script 38 configures two separate read requests, a first read request for a designated data block comprising, for instance, 512 bytes, and a second read request for an additional 12 bytes of check data. Read Script 38, including the two read requests, is then dispatched by PCI/SCSI controller 26 to PCI bridge 22. The aforesaid actions are illustrated in FIGS. 2a and 2b by steps 50, 52 and 54.

Upon receiving the read requests, PCI bridge 22 passes them to data storage subsystem 12 for execution. In response, storage processor 18 executes the read requests and passes the requested 512 byte data block and the 12 check bytes (e.g., 12) back to PCI bridge 22. The requested data block is buffered in data buffer 28 and the 12 check bytes are buffered in check data buffer 34 (step 56).

PCI bridge 22 then dispatches the 512 byte data block from data buffer 28 to PCI/SCSI controller 26 where it is temporarily stored in data block buffer 36. As shown in step 58, PCI bridge 22, after invoking data check procedure 30 to determine that the data block was properly received, causes the 12 bytes of check data in check data buffer 34 to be discarded. Bridge processor 24 maintains track of the address of the last data segment dispatched to PCI/SCSI controller 26 as part of the control procedure related to sequential addressing.

Note that because the check data is discarded, it is invisible to the address sequence tracking procedure carried out by bridge processor 24. Finally, bridge processor 24 executes a data block pre-stage action by accessing a next-in-sequence data block from data storage subsystem 12. Upon receipt of that data block, it is stored in pre-stage buffer 32.

Concurrently, PCI/SCSI controller 26 transmits the initially accessed data block to host processor 14 via SCSI bus 40 (step 60). Thereafter, upon host processor 14 dispatching a next read request for a next-in-sequence data block, PCI/SCSI controller 26 dispatches a Read Script 38 to PCI bridge 22 indicating the read request and the initial address of the to-be-read data block. Since bridge processor 24 is aware of the last data byte address dispatched to PCI/SCSI controller 26, it is able to handle the next block read request by accessing the already available staged data block from pre-stage buffer 32 and dispatching that data block directly to PCI/SCSI controller 26. A prestage action is then performed to up-load the next in sequence data block from data storage subsystem 12.

Accordingly, as can be seen from the above description, PCI bridge 22 is enabled to ignore, for the purposes of address sequencing control, the check data that is appended to data blocks dispatched by data storage subsystem 12. Further, the pre-stage operation carried out by PCI bridge module 22 is unaffected by the presence of the dispatched check data bytes.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A system for coupling at least a host processor to a memory subsystem and for enabling efficient transfer of data between said host processor and said memory subsystem, said memory subsystem responding to a data block read request for a designated data block by dispatching at least said designated data block and N check data segments for use in determining an integrity of transfer of said data block, said system comprising:

a first bus system, operated in accord with a first protocol, coupled to said memory subsystem;

controller means coupled to said host processor and responsive to a read request for a first data block from said host processor to create first modified read requests for said first data block and said N check data segments, and transferring said first modified read requests to said first bus system; and a bridge circuit coupled to said first bus system and responsive to said first modified read requests to:
   i) transfer said first modified read requests to said memory subsystem, and
   ii) transfer said first data block provided in response to said first modified read requests from said memory subsystem, along said first bus system, to said controller means and to discard said N check data segments;

said controller means operative to transfer said first data block to said host processor;

said bridge circuit, upon receiving further modified read requests for a next data block that is sequential to said first data block, recognizing a continuity of sequential data block addresses with respect to said first modified read requests.

2. The system as recited in claim 1, wherein said bridge circuit maintains track of an address of a last data segment transferred to said controller means.

3. A system for coupling at least a host processor to a memory subsystem and for enabling efficient transfer of data between said host processor and said memory subsystem, said memory subsystem responding to a data block read request for a designated data block by dispatching at least said designated data block and N check data segments for use in determining an integrity of transfer of said data block, said system comprising:

a first bus system, operated in accord with a first protocol, coupled to said memory subsystem;

controller means coupled to said host processor and responsive to a read request for a first data block from said host processor to create first modified read requests for said first data block and said N check data segments, and transferring said first modified read requests to said first bus system; and a bridge circuit coupled to said first bus system and responsive to said first modified read requests to:
   i) transfer said first modified read requests to said memory subsystem, and
   ii) transfer said first data block provided in response to said first modified read requests from said memory subsystem, along said first bus system, to said controller means and to discard said N check data segments;

said controller means operative to transfer said first data block to said host processor;

said bridge circuit, upon receiving further modified read requests for a next data block that is sequential to said first data block, recognizing a continuity of sequential data block addresses with respect to said first modified read requests, wherein said bridge circuit, upon receiving said first modified read request, anticipates a request for a next data block in addresses that are in sequence from said first data block and acts to download said next data block in advance of receiving a read request therefor.

4. The system as recited in claim 1, wherein said first bus system comprises a Peripheral Component Interconnect (PCI) bus system.

5. The system as recited in claim 1, wherein said host processor is coupled to said controller means via a second bus system configured as a Small Computer System Interface (SCSI) bus system.

6. A memory media including code for controlling a system to couple at least a host processor to a memory subsystem, said memory subsystem responding to a data block read request by dispatching at least said data block and a further check data segment for use in determining an integrity of transfer of said data block, said system further including a first bus system operated in accord with a first protocol coupled to said memory subsystem, a controller coupled to said host processor and being responsive to a read request for a block of data from said host processor to transfer said read request to said first bus system, and a bridge circuit coupled to said first bus system, said memory media comprising:

a) means for controlling said controller means to respond to a read request for a first data block from said host processor by creating modified read requests for said first data block and said N check data segments, and transferring said modified read requests to said bridge circuit;

b) means for controlling said bridge circuit to respond to said modified read requests by:
   i) transferring said modified read requests to said memory subsystem,
   ii) transferring said first data block provided in response to said modified read requests from said memory subsystem, to said controller means and maintaining track of said transferring so as to be able to determine if a next requested data block is sequential in address from said first data block,
   iii) discarding received ones of said N check data segments; and
   iv) upon receiving further modified read requests for a next data block and recognizing a continuity of sequential data block addresses, transferring said further modified read requests to said memory subsystem.

7. A memory media including code for controlling a system to couple at least a host processor to a memory subsystem, said memory subsystem responding to a data block read request by dispatching at least said data block and a further check data segment for use in determining an integrity of transfer of said data block, said system further including a first bus system operated in accord with a first protocol coupled to said memory subsystem, a controller coupled to said host processor and being responsive to a read request for a block of data from said host processor to transfer said read request to said first bus system, and a bridge circuit coupled to said first bus system, said memory media comprising:

a) means for controlling said controller means to respond to a read request for a first data block from said host processor by creating modified read requests for said first data block and said N check data segments, and transferring said modified read requests to said bridge circuit;

b) means for controlling said bridge circuit to respond to said modified read requests by:

i) transferring said modified read requests to said memory subsystem, ii) transferring said first data block provided in response to said modified read requests from said memory subsystem, to said controller means and maintaining track of said transferring so as to be able to determine if a next requested data block is sequential in address from said first data block, iii) discarding received ones of said N check data segments, iv) upon receiving said first modified read request, to anticipate a request for a next data block in addresses that are in sequence from said first data block and to download said next data block in advance of receiving a read request therefor, and v) upon receiving further modified read requests for said next data block and recognizing a continuity of sequential data block addresses, transferring said further modified read requests to said memory subsystem.

8. The memory media as recited in claim 6, wherein said first bus system comprises a Peripheral Component Interconnect (PCI) bus system.

9. The memory media as recited in claim 6, wherein said host processor is coupled to said controller via a second bus system that comprises a Small Computer System Interface (SCSI) bus system.

10. The system as recited in claim 1, wherein said first modified read requests comprise a first read request that includes an address of said first data block and a second read request that includes an address of said N check data segments.

11. The memory media as recited in claim 6, wherein said modified read requests comprise a first read request that includes an address of said first data block and a second read request that includes an address of said N check data segments.

* * * * *